US006937727B2

(12) United States Patent
Yup et al.

(10) Patent No.: US 6,937,727 B2
(45) Date of Patent: Aug. 30, 2005

(54) CIRCUIT AND METHOD FOR IMPLEMENTING THE ADVANCED ENCRYPTION STANDARD BLOCK CIPHER ALGORITHM IN A SYSTEM HAVING A PLURALITY OF CHANNELS

(75) Inventors: Nhu-Ha Yup, Phoenix, AZ (US); Satish N. Anand, Chandler, AZ (US)

(73) Assignee: Corrent Corporation, Tempe, AZ (US)

( * ) Notice: Subject to any disclaimer, the term of this patent is extended or adjusted under 35 U.S.C. 154(b) by 878 days.

(21) Appl. No.: 09/877,470

(22) Filed: Jun. 8, 2001

(65) Prior Publication Data

US 2002/0191784 A1 Dec. 19, 2002

(51) Int. Cl.[7] .............................. H04K 1/00; H04F 9/00
(52) U.S. Cl. ............................ 380/37; 380/42; 380/28; 380/255; 713/168
(58) Field of Search ................................ 713/168, 153; 380/37, 28, 42, 255

(56) References Cited

U.S. PATENT DOCUMENTS

| | | | | |
|---|---|---|---|---|
| 5,956,405 | A | * | 9/1999 | Yuval ........................... 380/29 |
| 6,185,679 | B1 | * | 2/2001 | Coppersmith et al. ...... 713/150 |
| 2002/0051534 | A1 | * | 5/2002 | Matchett et al. .............. 380/37 |
| 2002/0191793 | A1 | * | 12/2002 | Anand et al. ............... 380/255 |

FOREIGN PATENT DOCUMENTS

| | | |
|---|---|---|
| DE | 197 24 072 A1 | 10/1998 |
| ES | 002219874 | 10/2001 |

OTHER PUBLICATIONS

Joan Daemen, Vincent Rijmen; Aes Proposal: Rijndael; Mar. 9, 1999, Version 2.
"The Advanced Encryption Standard (Rijndael)" visited Jan. 26, 2001, <http://home.ecn.ab.ca/~isavard/crypto/co040801.htm>.

* cited by examiner

Primary Examiner—Norman M. Wright
(74) Attorney, Agent, or Firm—Ingrassia Fisher & Lorenz PC (57) ABSTRACT

A circuit includes a single circuit portion for implementing the Advanced Encryption Standard (AES) block cipher algorithm in a system having a plurality of channels. The circuit portion includes a circuit for individually generating, on the fly, the round keys used during each round of the AES block cipher algorithm. The circuit portion also includes shared logic circuits that implement the transformations used to encrypt and decrypt data blocks according to the AES block cipher. The single circuit portion encrypts or decrypts data blocks from each of the plurality of system channels in turn, in round-robin fashion. The circuit portion also includes a circuit for determining S-box values for the AES block cipher algorithm. The circuit additionally implements an efficient method for generating round keys on the fly for the AES block cipher decryption process.

52 Claims, 3 Drawing Sheets

CIRCUIT AND METHOD FOR IMPLEMENTING THE ADVANCED ENCRYPTION STANDARD BLOCK CIPHER ALGORITHM IN A SYSTEM HAVING A PLURALITY OF CHANNELS

BACKGROUND OF THE INVENTION

1. Field of the Invention

The present invention relates to a circuit and method for implementing a block cipher algorithm and, more particularly, to a circuit and method for implementing the Advanced Encryption Standard (AES) block cipher algorithm in a system having a plurality of channels.

2. Description of Related Art

The AES block cipher algorithm (hereinafter "AES cipher") is an iterative cipher algorithm, meaning the data is similarly manipulated a predetermined number of rounds. The AES cipher additionally allows for both a variable block length and variable key length. Specifically, both the block length and key length can be independently set to 128, 192, or 256 bits. The AES cipher also allows for a variable number of rounds (Nr), the total of which may be 10, 12, or 14, and which depends on the block length and key length.

The AES cipher encrypts a block of data by performing 9, 11, or 13 complete round transformations, followed by a final incomplete round transformation. The incomplete round transformation includes one less step than a complete round transformation. The data string that is operated upon during each round is called a "State," which can be represented as a rectangular array of bytes having four rows and a number of columns (Nb) that varies with the block length. Specifically, the value of Nb is equal to the block length (i.e., 128, 192, or 256) divided by 32, meaning it has a value of either 4, 6, or 8. Each of the complete rounds includes the following four transformations, performed in the following order: (1) ByteSub; (2) ShiftRow; (3) MixColumn; and (4) AddRoundKey. The incomplete round transformation does not include the MixColumn transformation.

Similar to encryption, the AES cipher decrypts data by performing the same number of complete rounds followed by an incomplete round. Because the encryption transformations are invertible, the State of each decryption round is operated on by the inverse of the above-noted transformations. Moreover, the properties of the transformations and inverse transformations allow for symmetry in the encryption and decryption algorithms. In other words, each complete decryption round includes the following inverse transformations, which may be performed in the listed order: (1) InvByteSub; (2) InvShiftRow; (3) InvMixColumn; and (4) InvAddRoundKey. Again, similar to encryption, the incomplete decryption round transformation does not include the InvMixColumn transformation.

As noted above, the initial step in the AES cipher is the ByteSub transformation of the State. In this step, the individual bytes of the State are substituted according to values given in a substitution-box, or S-box. The formula for creating the S-box is disclosed in the Rijndael block cipher specification, the entirety of which is incorporated herein by reference. In summary, what the ByteSub transformation does is replace each byte of the State with its reciprocal in $GF(2^8)$, multiplied by a bitwise modulo 2 matrix, and XORed with hex '63'. The InvByteSub transformation is a byte substitution using the inverse S-box.

During the ShiftRow transformation, the individual rows of the State are shifted over different offsets. Specifically, Row 0 is not shifted, Row 1 is shifted over N1 bytes, Row 2 over N2 bytes, and Row 3 over N3 bytes. The values of N1, N2, and N3 depend on the particular block length. The InvShiftRow transformation is a cyclic shift of Rows 1–3 (again, there is no shift for Row 0) over Nb-N1, Nb-N2, and Nb-N3 bytes, respectively. Again, Nb represents the block length of the State (i.e., 4, 6, or 8).

After the ShiftRow transformation, the MixColumn transformation operates on the State. In the MixColumn transformation, each column of the State is multiplied by the polynomial:

$$c(x)='03'x^3+'01'x^2+'01'x+'02'.$$

In the InvMixColumn transformation, each column of the State is multiplied by the polynomial:

$$d(x)='0B'x^3+'0D'x^2+'09'x+'0E',$$

where the polynomial $d(x)$ is defined by the following relationship:

$$('03'x^3+'01'x^2+'01'x+'02')\otimes d(x)='01'.$$

Finally, in the AddRoundKey transformation, a Round Key is XORed with the State on a bitwise basis. It is noted that AddRoundKey is its own inverse. Thus, the AddRoundKey and InvAddRoundKey transformations are the same.

Each of the Round Keys that are used in each transformation round is derived from an Expanded Key, which is generated from the Cipher Key. More particularly, the Expanded Key is generated by a key expansion process, which may be performed before or during (i.e., "on-the-fly") the encryption process. Basically, the result of the key expansion process is an Expanded Key whose length is 11, 13, or 15 times that of the original Cipher Key for Nb values of 4, 6, and 8, respectively (e.g., Nb(Nr+1)), and consists of the original Cipher Key, followed by 128-, 192-, or 256-bit blocks consisting of 4-byte words. Each of these 4-byte words is the XOR of the preceding 4-byte word and either the corresponding word in the previous block or a function thereof. Each Round Key is a 128-, 192-, or 256-bit block of the Expanded Key. It is noted that, generation of the Round Keys for the decryption process requires that all of the Round Keys from the encryption process be generated first, since the last Round Key is used first during the decryption process.

The AES cipher, as disclosed in the Rijndael block cipher specification, is a fairly straightforward encryption and decryption scheme. The specification further discloses various hardware implementations and methodologies implemented by the hardware for the scheme. However, the hardware implementations address only single channel implementations, and do not disclose how to implement the AES cipher in a system having a plurality of channels. Additionally, while the specification discloses generating Round Keys on the fly in order to save RAM, it does not disclose how to efficiently perform on the fly Round Key generation for the decryption process. The specification further fails to disclose a hardware implementation for efficiently determining S-box and inverse S-box data substitution values used in the ByteSub and InvByteSub transformations without having to generate the S-box or use a table look-up scheme.

Hence, there is a need in the art for a circuit and method that solves the above-identified problems. Namely, a circuit that implements the AES cipher in system having a plurality of channels, a circuit that efficiently determines AES cipher S-box and inverse S-box data substitution values or a data string, and a method for efficiently generating Round Keys used in decryption rounds of the AES cipher on-the-fly.

SUMMARY OF THE INVENTION

The present invention provides a circuit that implements the AES cipher algorithm in a system having a plurality of channels. The circuit is coupled to the plurality of channels and utilizes shared logic blocks to encrypt and decrypt the information in the channels in a round-robin fashion. The invention additionally provides a circuit that efficiently implements the ByteSub and InvByteSub transformations, by selectively determining the substitution values in a shared logic block, without having to generate the S-box or use a table look-up scheme. The present invention further provides a method of generating Round Keys on the fly for use in decryption rounds of the AES cipher.

In one aspect of the present invention, a circuit for implementing the Advanced Encryption Standard (AES) Rijndaeal block cipher algorithm in a system having a plurality of channels includes one input means in each channel, one cipher key storage means in each channel, key expansion means, encryption/decryption means, and one output means in each channel. Each of the output means receives a data string of a first predetermined bit length. Each of the cipher key storage means stores a received cipher key. The key expansion means selectively receives one of the stored cipher keys from one of the plurality of cipher key storage means, and expands the selectively received cipher key a predetermined number of times based on the AES Rijndael key expansion algorithm. The encryption/decryption means selectively receives one of the data strings of the first predetermined bit length from one of the plurality of input means and an expanded key from the key expansion means, encrypts/decrypts the selectively received data string a predetermined number of rounds based on the AES block cipher algorithm, and outputting an encrypted/decrypted data string of the first predetermined bit length. Each of the output means selectively receives the encrypted/decrypted data string from the encryption/decryption means. The encryption/decryption means selectively encrypts or decrypts the received data string based on a received control signal.

In another aspect of the present invention, a circuit for selectively determining S-box and inverse S-box data substitution values for a data string, in which the substitution values are associated with the ByteSub and InvByteSub functions, respectively, of the Advanced Encryption Standard (AES) Rijndaeal block cipher algorithm, includes inverse affine means, first and second data switching means, inverse vector data byte determination means, and affine transformation means. The inverse affine means receives a vector data byte and performs an inverse affine transformation thereon to generate a transformed vector data byte. The first data switching means receives the vector data byte, the transformed vector data byte, and an encrypt/decrypt control signal, and transmits the vector data byte when the control signal indicates the circuit is in an encrypt state and transmits the transformed vector data byte when the control signal indicates the circuit is in a decrypt state. The inverse vector data byte determination means selectively receives one of the vector data byte and the transformed vector data byte, in accordance with the control signal received by the first data switching means, and determines an inverse vector data byte. The affine transformation means receives the inverse vector byte and applies an affine transformation thereon to generate a transformed inverse vector data byte, The second data switching means receives the inverse vector data byte, the transformed inverse vector data byte, and the encrypt/decrypt control signal, and transmits the inverse vector data byte when the control signal indicates the circuit is in an encrypt state and transmits the transformed inverse vector data byte when the control signal indicates the circuit is in a decrypt state.

In still a further aspect of the present invention, a method of efficiently generating round keys on-the-fly for use in decryption rounds of the AES Rijndael cipher block algorithm includes a storing step, a retrieving step, and a generating step. The storing step stores a key used in a final encryption round of the AES algorithm to encrypt a block of data. The retrieving step retrieves the stored key in response to a decryption command. The generating step generates a new key for use in each subsequent decryption round, without storing the new key each time one is generated and used.

Other features and advantages of the present invention will become apparent from the following detailed description, taken in conjunction with the accompanying drawings, which illustrate, by way of example, the principles of the invention.

DETAILED DESCRIPTION OF THE INVENTION

Figure 1:
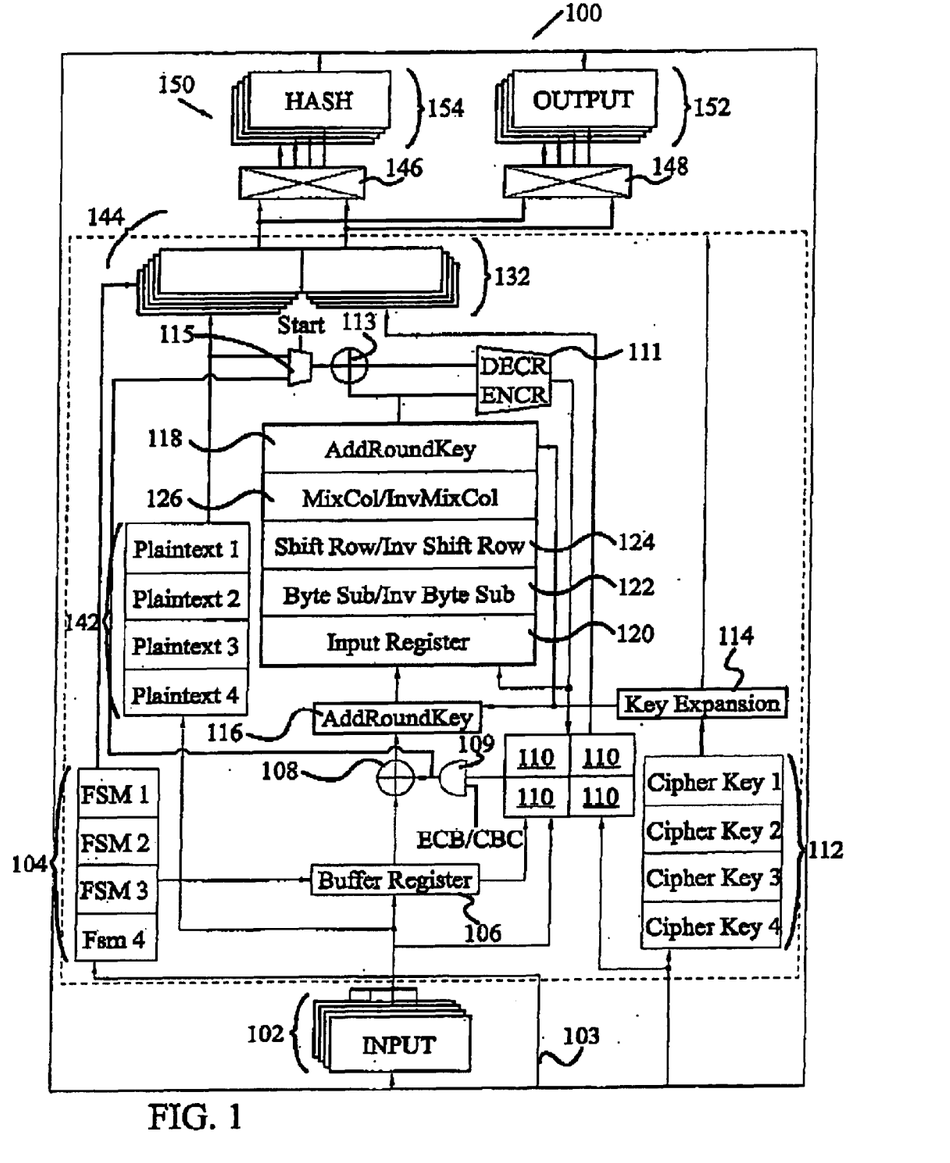
FIG. 1 is a block diagram of a circuit used to implement the Advanced Encryption Standard Rijndaeal block cipher algorithm in a plurality of channels.

A block diagram of a circuit used to implement the Advanced Encryption Standard Rijndaeal block cipher algorithm in a system having a plurality of channels is depicted in FIG. 1. As depicted therein, the circuit 100 includes a plurality of input registers 102, one each coupled to the plurality of system channels. Although the present invention encompasses various numbers of system channels, the preferred embodiment is directed to a system having four channels. Thus, four input registers 102 are depicted in FIG. 1. The input registers 102 are preferably simple first-in-first-out (FIFO) registers, though the skilled artisan will appreciate that other types of registers could be used. The input registers 102 each receive a data string of a first predetermined bit length from its corresponding system channel. In the preferred embodiment, the predetermined bit length is 64 bits, though larger data strings could be used.

The circuit 100 also includes a plurality of control signal input lines 103, one for each channel, coupled to receive control signals from systems and circuits external to the circuit 100. The control signals are coupled, one each, to a plurality of finite state machine controllers (FSMs) 104. There is one FSM 104 associated with each channel, each of which, in response to the received control signals, controls the operation of the remaining portions of the circuit 100.

The input registers 102 are all coupled to a single buffer register 106. The buffer register 106, under control of one of the plurality of FSMs 104, selectively retrieves and stores a plurality of data strings of a predetermined bit length from one of the FIFO registers 102, until a data block of a predetermined bit length is stored in the buffer register 106. The predetermined bit length of the data block is one of the block lengths supported by the AES block cipher, namely a 128-, a 192-, or a 256-bit length.

The output of the buffer register 106 is coupled to a first XOR circuit portion 108 that performs a logical exclusive-OR function (XOR). Specifically, the first XOR circuit portion 108 receives the data block from the buffer register 106, and another data block, of the same predetermined bit length, from an AND circuit portion 109 that performs a logical AND function, and XORs the two bit strings together. The data block supplied to the first XOR circuit portion 108 from the AND circuit portion 109 is supplied from one of a plurality of storage registers 110. Again, there is one storage register 110 for each system channel. The storage registers 110 each store the initial value of the particular data block that is being encrypted (or decrypted), and subsequently encrypted (or decrypted) values thereafter. The AND circuit portion 109, responsive to an ECB/CBC control signal on another input thereof, will either transmit the data stored in the storage registers 110 or will transmit zeros to the first XOR circuit portion 108. Specifically, if it is desired to have the circuit 100 operate in CBC mode, as is generally known in the art, then the ECB/CBC control signal will cause the initial and subsequent values stored in the storage registers to be transmitted, via the AND circuit portion 109, to the first XOR circuit portion 108 for XORing with the data block from the buffer register 106. If, however, it is desired to have the circuit 100 operates in ECB mode, then the ECB/CBC control signal will cause AND circuit portion 109 to transmit only zeros to the first XOR circuit portion 108.

In addition to having a storage register 110 for each channel, the circuit 100 also includes a cipher key storage register 112 for each system channel. The cipher key storage registers 112 receive and store the cipher key associated with each system channel and, under control of its respective FSM 104, transmit the stored cipher key to a key expansion block 114. The key expansion block 114 generates a single round key by performing a single key expansion operation for each round of the AES block cipher. More particularly, rather than performing the entire AES block cipher key expansion operation on the channel cipher key, and storing the entire expanded key in memory, the key expansion block generates the round keys used for each AES round on-the-fly. Thus, a significant amount of memory is saved. In the preferred embodiment, each encryption round key is generated on-the-fly according to the following algorithm:

New_W0=Old_W0 XOR Kf(Old_W(nk−1);

New_W1=Old_W1 XOR New_W0;

.

.

.

New_W(nk−1)=Old_W(nk−1)XOR New_W(nk−2), where, nk=key size; nb=block size; and Kf is a function defined in the Rindeal block cipher specification.
It is noted however, that for nk=8 the above algorithm is modified as follows:

New_W4=Old_W4 XOR ByteSub(New_W3).

Prior to each round of the AES block cipher that is performed, the key expansion block 114 transmits the round key to first 116 and second 118 AddRoundKey functional blocks. The data block from the buffer register 106, which was XORed with the data block from the storage register 110, is additionally transferred to the first AddRoundKey functional block 116. The first AddRoundKey functional block 116 receives these data blocks and performs the initial AddRoundKey transformation on the data block in accordance with the AES block cipher. The data block from the first AddRoundKey functional block 116 is then transmitted to a cipher block input register 120.

The data block transmitted to the cipher block input register 120 is then operated upon by various AES functional blocks that perform the remaining AES block cipher transformations, for either encryption or decryption. Specifically, if the received control signals instruct the FSM 104 for the particular channel to encrypt data, then the encryption transformations will be operative. Conversely, if the received control signals instruct the FSM 104 for the particular channel to decrypt data, then the decryption transformations will be operative. The functional blocks that carry out the transformation share combined logic circuitry for carrying out the encryption and decryption transformations. Thus, a first transformation block 122 performs either the ByteSub or InvByteSub transformation on the received data block, based on a signal received from the particular channel FSM 104. Likewise, second 124 and third 126 transformation blocks perform either the ShiftRow or InvShiftRow and MixCol or InvMixCol, respectively, based on the signal received from the particular channel FSM 104. Hence, the data block is successively operated upon by these AES functional blocks 122, 124, 126 and then transmitted to the second AddRoundKey block 116 for the AddRoundKey transformation for that particular round.

After this initial transformation round, the data block is fed back to the cipher block input register 120 for the next transformation round via one of two paths, depending upon whether the data block is being encrypted or decrypted. Specifically, if the data block is being encrypted, then the data block is fed back to the cipher block input register without additional processing, via a first multiplexer circuit 111. Conversely, if the data block is being decrypted, then the data block is fed back to the cipher block input register 120, via the first multiplexer circuit 111, after being operated upon by a second XOR circuit portion 113. More particularly, the second XOR circuit portion 113 receives data from a second multiplexer circuit 115 and XORs this data with the data block output from the second AddRoundKey block 118. If the circuit is being operated in CBC mode, then the second multiplexer circuit 115, under control of a START control signal, will first transmit an encrypted data block from the initial value stored in the storage registers 10 and thereafter an encrypted data block transmitted to a plaintext storage register 142 (described in more detail below). If, however, the circuit is being operated in the ECB mode, then the second multiplexor will transmit only zeros to the second XOR circuit portion 113. In addition to this, the key expansion block 114 generates a new round key for use in the next transformation round. The above-noted transformations are then repeated on the data block that is fed back. This cycle continues until the data block has been transformed a predetermined number of rounds.

Once the predetermined numbers of transformation rounds are completed, the encrypted data block is fed back to the appropriate storage register 110 for that particular channel. Thus, if the circuit 100 is being commanded to operate in the CBC mode, this encrypted data block is available for use with the next data block from this same channel that is to be encrypted. The encrypted data block that is fed back to the storage register 110 is also transmitted to one of a plurality of cipher block output storage registers 132 that is associated with each channel. The encrypted data block in the cipher block output storage register 132 is then transmitted to the circuit 100 output portion, which will be discussed below in more detail.

After the predetermined number of transformation rounds is completed, the last round key in the key expansion block 114 is stored in memory external to the circuit 100. This last round key is then available for use as the initial round key value during a subsequent decryption operation. Thus, the circuit 100 is not required to perform the entire key expansion operation to get to the last round key, which saves processing and set-up time for subsequent decryption operations.

In addition to the above-described circuitry used to perform the AES block cipher, the circuit 100 also includes circuitry for transmitting the data strings in each channel to the output without performing any AES transformations thereon. The circuitry used for this function includes the above-mentioned plurality of plaintext storage registers 142, one associated with each channel. The data strings transferred to the buffer register 106 from one of the channel-input registers 102 are also transferred to the appropriate plaintext storage register 142. The data strings are stored in the plaintext storage register 142 until the other data strings have been encrypted (or decrypted) the predetermined number of rounds by the encryption/decryption circuitry. The so-called "plaintext" data in the plaintext storage register 142 is then transmitted to one of a plurality of plaintext output registers 144 (one for each channel) substantially simultaneously with the transmission of the encrypted (or decrypted) data block to the appropriate cipher block output storage register 132. The plaintext data is also available to the circuit's output portion.

The output portion 150 of the circuit 100 includes a plurality of output registers 152 and a plurality of hashing registers 154 coupled to selectively receive a data string of the first predetermined bit length either from one of the cipher block output storage registers 132 or from one of the plaintext output registers 144. Each channel includes one output register 152 and one hashing register 154. The data strings are selectively transmitted to the particular channel output register 152 or hashing register 154 via third and fourth multiplexer circuits 146, 148 coupled to each of the registers 152, 154. The data that is to be transmitted directly to other processing circuitry within the particular channel that is external to the circuit 100 are transferred to the appropriate output register 152. The data that is first required to be hashed is transferred to the appropriate hashing register 154 for hashing by circuitry external to the circuit 100.

As was noted above, each data block is encrypted or decrypted a predetermined number of rounds. This predetermined number of rounds depends upon the size of both the data block being encrypted/decrypted and the key length. It is known that the AES block cipher can be performed on 128-bit, 192-bit, or 256-bit blocks. It is further known that the AES block cipher can use varying key lengths for each round key, which may also be 128-bits, 192-bits, or 256-bits long. It is noted, however, that for the circuit 100 of the present invention, the block length, key length, and number of rounds are more constrained than what is provided for by the AES block cipher algorithm. Specifically, the circuit 100 supports only equivalent block lengths and key lengths of 128-, 192-, and 256-bits, and thus only 10, 12, or 14 transformation rounds, respectively.

As was noted throughout the above description, the circuit 100 is coupled to a system having a plurality of channels. Moreover, while the circuit 100 includes various functional blocks having a one-for-one correspondence with the plurality of system channels, the circuit 100 includes only a single circuit portion for performing the AES cipher. Hence, the circuit 100 is controlled to operate in a "round robin" fashion on each channel. In other words, the control signals coupled to the FSMs 104 will cause the circuit 100 to perform the predetermined number of encryption (or decryption) rounds on a block of data from a first channel, and then perform the encryption (or decryption) rounds on another channel, and then another, and then another, through all of the channels. The control signals will then cause the circuit 100 to start over on the first channel.

It was previously noted that the functional blocks used to carry out the various AES transformations share combined logic circuitry for both encryption and decryption. The functional blocks, with one exception, comprise conventionally known circuits for carrying out each transformation. The exception is with respect to the combined logic circuitry used to implement the ByteSub and InvByteSub transformations. This particular circuitry is depicted in FIG. 2.

Figure 2:
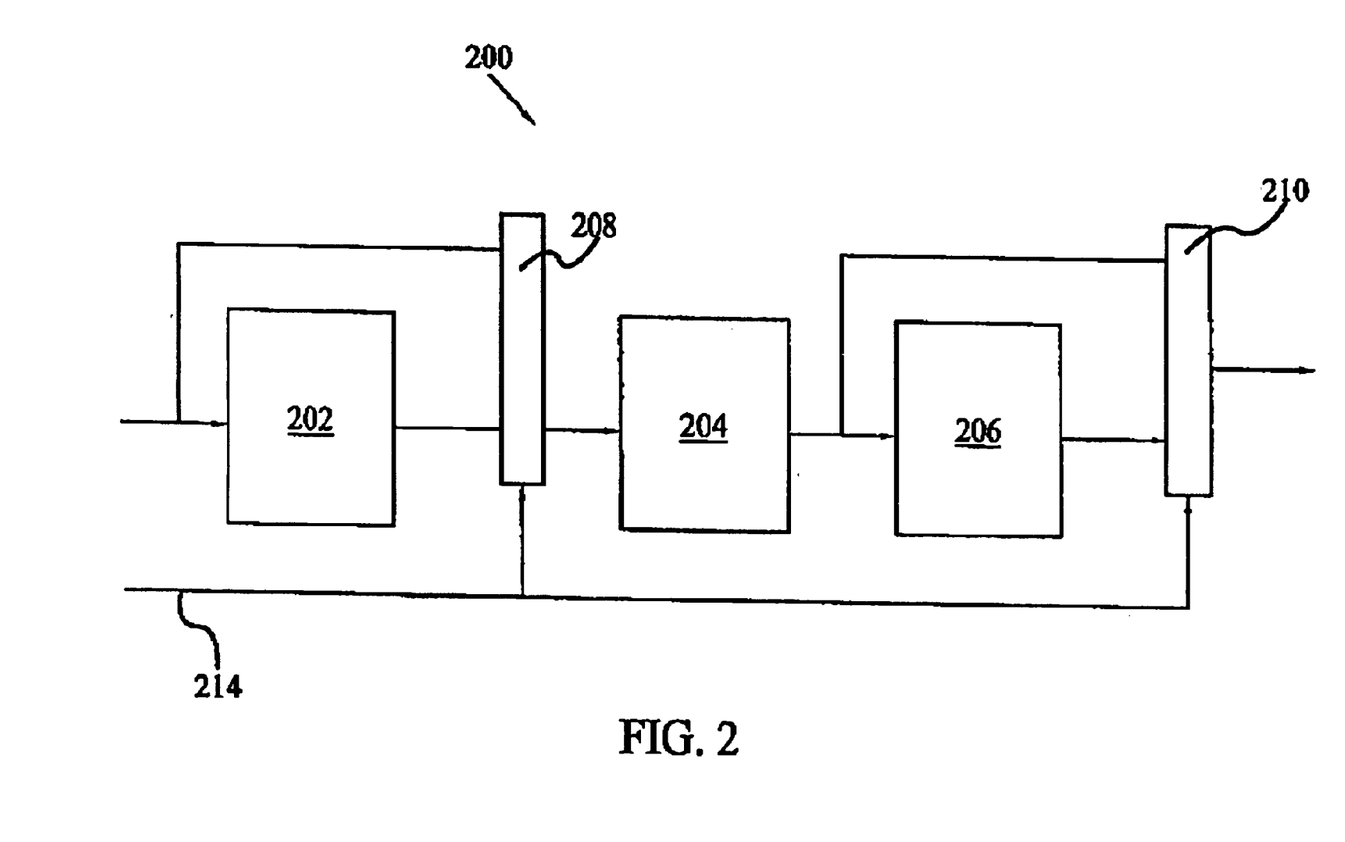
FIG. 2 is a block diagram of a circuit that selectively determines S-box and inverse S-box data substitution values for a data string that may be used in the circuit of FIG. 1.

As FIG. 2 depicts, the ByteSub/InvByteSub circuit 200 includes three discrete functional blocks and two multiplexers. The first block 202 ("inverse-affine block") is functional to perform the inverse affine(x) function on a data byte, the second block 204 ("ginv block") is functional to perform the ginv(x) function on a data byte, and the third block 206 ("affine block") is functional to perform the affine(x) function on a data byte. Not all of the blocks are used for both encryption and decryption. Specifically, the ginv block 204 and affine block 206 are used for encryption, and the inverse-affine block 202 and ginv block 204 are used for decryption.

The flow of data in the ByteSub/InvByteSub circuit 200 is controlled using the two multiplexers, hereinafter referred to as the first 208 and the second 210 multiplexers which receive control signals from each of the plurality of FSMs 104 via control line 214. Specifically, when configured for encryption, the control signals on control line 214 will cause the first multiplexer 208 to transmit the input data byte directly to the ginv functional block 204, and the second multiplexer 210 to transmit the data byte from the affine functional block 206 to the output. Conversely, when configured for decryption, the control signals on line 214 will cause the first multiplexer 208 to transmit the data byte from the inverse-affine functional block 202 to the ginv functional block 204, and the second multiplexer 210 to transmit the data byte from the second functional block 204 directly to the output. Hence, during encryption, each input data byte is operated upon by the ginv(x) and affine(x) functions, and during decryption, each input data byte is operated upon by the inverse affine(x) and ginv(x) functions. Each of these particular functions is briefly discussed below.

The ginv(x) function calculates the pseudo-inverse of (x) in $GF(2^8)$, such that $(x) \cdot (x)^{-1} \mod m(x) = 1$, where (x) and $(x)^{-1}$ are polynomials over $GF(2^8)$, and m(x) is the irreducible polynomial $x^8 + x^4 + x^2 + x + 1$. The affine(x) over $GF(2^8)$ is defined as:

$$\begin{bmatrix} y_0 \\ y_1 \\ y_2 \\ y_3 \\ y_4 \\ y_5 \\ y_6 \\ y_7 \end{bmatrix} = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \begin{bmatrix} x_0 \\ x_1 \\ x_2 \\ x_3 \\ x_4 \\ x_5 \\ x_6 \\ x_7 \end{bmatrix} + \begin{bmatrix} 1 \\ 1 \\ 0 \\ 0 \\ 0 \\ 1 \\ 1 \\ 0 \end{bmatrix}$$

The skilled artisan readily recognize the inverse affine(x) function that is carried out by the inverse-affine functional block 202, which utilizes the following matrix:

$$\begin{bmatrix} 0 & 0 & 1 & 0 & 0 & 1 & 0 & 1 \\ 1 & 0 & 0 & 1 & 0 & 0 & 1 & 0 \\ 0 & 1 & 0 & 0 & 1 & 0 & 0 & 1 \\ 1 & 0 & 1 & 0 & 0 & 1 & 0 & 0 \\ 0 & 1 & 0 & 1 & 0 & 0 & 1 & 0 \\ 0 & 0 & 1 & 0 & 1 & 0 & 0 & 1 \\ 1 & 0 & 0 & 1 & 0 & 1 & 0 & 0 \\ 0 & 1 & 0 & 0 & 1 & 0 & 1 & 0 \end{bmatrix}$$

By performing the ginv(x) and affine(x) functions on each input data byte during an encryption operation, the appropriate value from the AES cipher S-box is directly determined for each byte without having to generate the S-box or resort to table look-up methods. Similarly, the value from the AES cipher inverse S-box is directly determined during a decryption operation by performing the affineinv(x) function and the ginv(x) function on each input data byte.

It was additionally mentioned above that the circuit 100 performs round key generation on the fly during both encryption and decryption operations. Although the Rijndael block cipher specification generally discloses such functionality, it does not specifically disclose an efficient method for performing on the fly Round Key generation for the decryption process. The method implemented by the present invention, and which is depicted in flowchart form in FIG. 3, initially generates and stores only the last Round Key that was used during the encryption process. In a preferred embodiment, this method is implemented in response to a specific command. This Round Key is then used in the first decryption round. The Round Keys used in subsequent decryption rounds are then generated on-the-fly from the Round Keys used in the previous round. Thusonly a single Round Key is stored during each round of the decryption process, which requires less memory usage.

Figure 3:
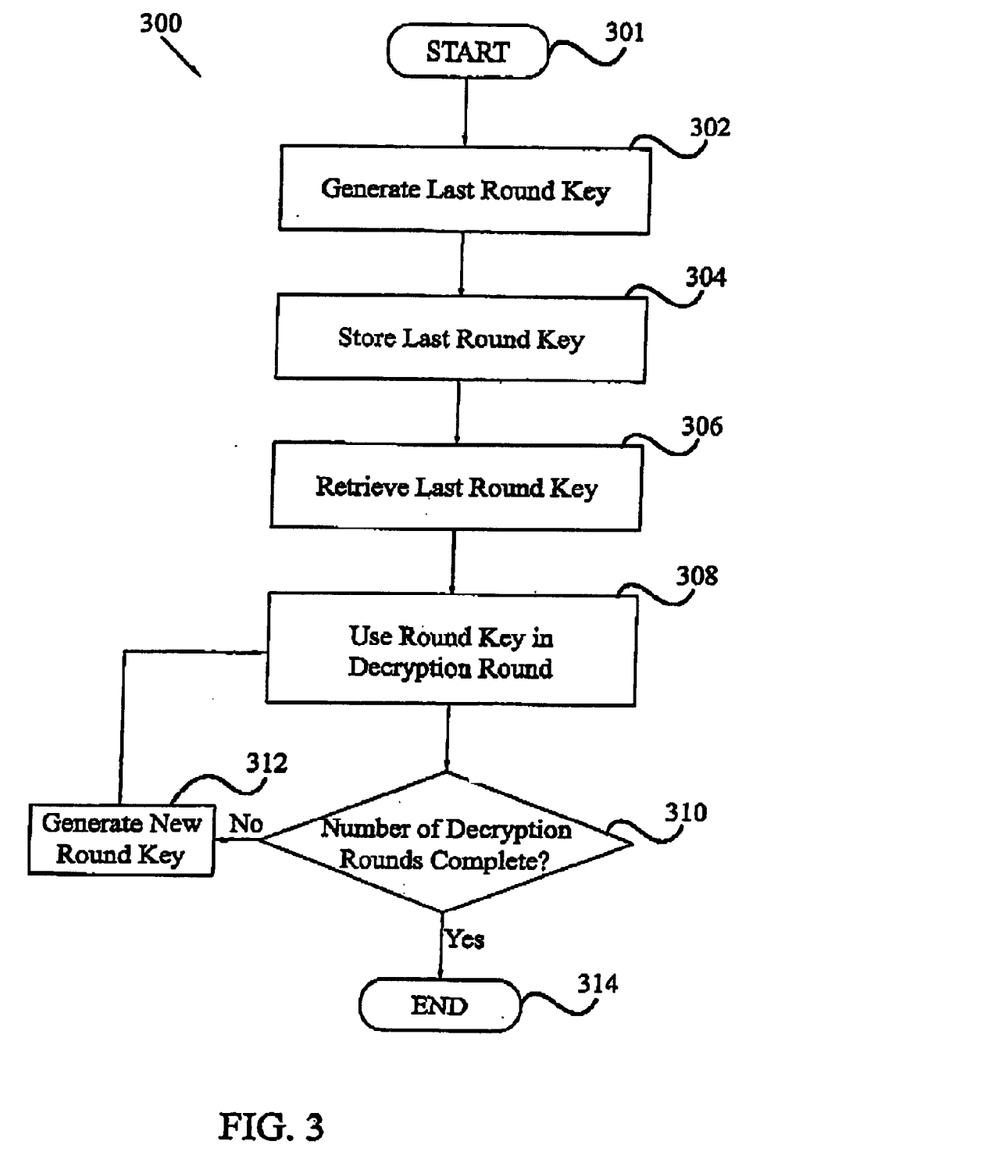
FIG. 3 is a flowchart depicting a method for efficiently generating round keys on-the-fly for use in decryption rounds of the AES Rijndael cipher block algorithm.

More particularly, as indicated in FIG. 3, the decryption Round Key generation process 300 begins (STEP 301) when the channel is configured to undergo a subsequent decryption process. As part of this configuration process, the key expansion block 114 receives a command to generate the last Round Key from a cipher key in one of the cipher key storage registers 112 (STEP 302). The last Round Key is then generated and stored in memory (STEP 304). When the channel is ready to begin the decryption process on an encrypted data block, the last Round Key is retrieved from memory (STEP 306). The retrieved Round Key is used by the AES block cipher algorithm during the first decryption round (STEP 308), and is then used to generate a new Round Key for subsequent decryption rounds (STEP 312). These two steps (STEPS 308, 312) are repeated until the appropriate number of decryption rounds (e.g., 10, 12, 14) is complete (STEP 310). The process then ends (STEP 314). In the preferred embodiment, each decryption round key that is generated in STEP 310 is generated according to the following algorithm:

New_W(nk-1)=Old_W(nk-1) XOR Old_W(nk-2);

New_W(nk-2)=Old_W(nk-2) XOR Old_W(nk-3);

New_W0=Old_W0 XOR Kf(New_W(nk-1), where again, nk=key size; nb=block size; and Kf is the function defined in the Rindeal block cipher specification. For nk=8, however, the above algorithm is modified as follows:

New_W4=Old_W4 XOR ByteSub(Old_W3).

The above-described process significantly reduces the set-up and processing time required for the AES block cipher decryption process. This is because the entire key space, up to and including the last Round Key, is not required to be generated before the decryption process can begin.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A circuit for implementing the Advanced Encryption Standard (AES) block cipher algorithm in a system having a plurality of channels, the circuit comprising:

round key generation means for (i) selectively receiving a cipher key and (ii) generating a round key of a first predetermined bit length from the received cipher key a predetermined number of times based on the AES Rijndael key expansion algorithm;

encryption/decryption means for (i) selectively receiving a data block of the first predetermined bit length from one of the plurality of system channels and a round key from the round key generation means and (ii) encrypting/decrypting the received data block a predetermined number of rounds based on the AES block cipher algorithm; and controller means, responsive to control signals from each of the plurality of system channels, for controlling the round key generation means and the encryption/decryption means to selectively encrypt or decrypt the data block from individual ones of the plurality of system channels in a round-robin fashion.

2. The circuit of claim 1, further comprising:

a plurality of cipher key storage means, one coupled to each of the plurality of system channels, for (i) storing a cipher key received from one of the system channels and (ii) transmitting the cipher key to the round key generation means.

3. The circuit of claim 1, further comprising:

buffer register means for (i) selectively receiving and concatenating a plurality of data strings of a second predetermined bit length from one of the plurality of system channels and (ii) transmitting the concatenated data strings to the encryption/decryption means as the data block of the first predetermined bit length.

4. The circuit of claim 3, further comprising:
a plurality of input means, one coupled to each of the plurality of system channels, for receiving the data strings of the second predetermined bit length from the plurality of system channels and (ii) selectively transmitting the data strings to the buffer register means.

5. The circuit of claim 1, further comprising:
a plurality of cipher text storage means, one associated with each of the plurality of system channels, for selectively receiving an encrypted/decrypted data block of the first predetermined bit length from the encryption/decryption means.

6. The circuit of claim 5, further comprising:
a plurality of output means, one coupled to each of the plurality of system channels, for selectively receiving an encrypted/decrypted data string of the second predetermined bit length from one of the plurality of cipher text storage means,
wherein the encrypted/decrypted data strings are portions of the encrypted/decrypted data blocks of the first predetermined bit length.

7. The circuit of claim 1, further comprising:
plaintext processing means for (i) selectively receiving a data string of the second predetermined bit length from one of the plurality of system channels and (ii) transmitting the received data string, unaltered, to one of the plurality of system channels.

8. The circuit of claim 1, wherein the encryption/decryption means comprises:
bytesub/invbytesub means, responsive to the controller means, for transforming the received data string according to either the ByteSub or InvByteSub function, as defined by the AES block cipher algorithm;
shiftrow/invshiftrow means, coupled to receive data from the bytesub/invbytesub means, and being responsive to the controller means, for transforming the received data according either the ShiftRow or InvShiftRow function, as defined by the AES block cipher algorithm; and
mixcol/invmixcol means, coupled to receive data from the shiftrow/invshiftrow means, and being responsive to the controller means, for transforming the received data according to either the MixCol or InvMixCol function, as defined by the AES block cipher algorithm.

9. The circuit of claim 8, wherein the bytesub/invbytesub means comprises:
inverse affine means for receiving a vector data byte and performing an inverse affine transformation thereon to generate a transformed vector data byte;
first data switching means for:
(i) receiving the vector data byte, the transformed vector data byte, and an encrypt/decrypt control signal; and
(ii) transmitting the vector data byte when the control signal indicates the circuit is in an encrypt state and transmitting the transformed vector data byte when the control signal indicates the circuit is in a decrypt state;
inverse vector data byte determination means for:
(i) selectively receiving one of the vector data byte and the transformed vector data byte, in accordance with the control signal received by the first data switching means; and (ii) determining an inverse vector data byte;
affine transformation means for receiving the inverse vector byte and applying an affine transformation thereon to generate a transformed inverse vector data byte; and
second data switching means for:
(i) receiving the inverse vector data byte, the transformed inverse vector data byte, and the encrypt/decrypt control signal; and
(ii) transmitting the inverse vector data when the control signal indicates the circuit is in an encrypt state and transmitting the transformed inverse vector data byte when the control signal indicates the circuit is in a decrypt state.

10. The circuit of claim 1, wherein the round key generation means:
generates a round key one time during each round of the AES block cipher algorithm.

11. The circuit of claim 10, wherein the each round key is generated according to the following algorithm:

New_W0=Old_W0 XOR Kf(Old_W(nk−1);

New_W1=Old_W1 XOR New_W0;

New_W(nk−1)=Old_W(nk−1) XOR New_W(nk−2);

where, nk=key size; nb=block size; and Kf is a function defined in the Rindeal block cipher specification,
wherein for nk=8 the above algorithm is modified as follows:

New_W4=Old_W4 XOR ByteSub(New_W3).

12. The circuit of claim 2, further comprising:
a plurality of final round key storage means, one in each of the plurality of system channels, for storing a key used for a final encryption round, as defined by the AES block cipher algorithm,
wherein the cipher key storage means in each channel, responsive to the controller means, retrieves the stored key for use in a first decryption round, as defined by the AES block cipher algorithm, and
wherein each round key used in subsequent decryption rounds is generated from the round key used in a previous decryption round.

13. The circuit of claim 1, further comprising:
CBC implementation means, responsive to the controller means, for implementing a CBC encryption mode.

14. The circuit of claim 13, wherein the CBC implementation means comprises:
initial value storage means for storing an initial round value; and
exclusive-OR means, responsive to the controller means, for receiving the stored initial value and XORing it with a value of a proceeding round.

15. The circuit of claim 1, wherein a combination of the first predetermined bit length/ predetermined number of times is selected from the group consisting of 128/10, 192/12, and 256/14.

16. A circuit for implementing the Advanced Encryption Standard (AES) block cipher algorithm in a system having a plurality of channels, the circuit comprising:
a plurality of cipher key storage means, one coupled to each of the plurality of system channels, for storing a cipher key received from one of the system channels;
buffer register means for selectively receiving and concatenating a plurality of data strings of a first predetermined bit length from one of the plurality of system channels into a data block of a second predetermined bit length.

round key generation means for (i) selectively receiving one of the stored cipher keys from one of the plurality of cipher key storage means and (ii) generating a round key of the second predetermined bit length from the received cipher key a predetermined number of times based on the AES Rijndael key expansion algorithm;

encryption/decryption means for (i) selectively receiving a data block of the second predetermined bit length from the buffer register means and a round key from the round key generation means and (ii) encrypting/decrypting the received data block a predetermined number of rounds based on the AES block cipher algorithm; and controller means, responsive to control signals from each of the plurality of system channels, for controlling the round key generation means and the encryption/decryption means to selectively encrypt or decrypt a data block from individual ones of the plurality of system channels in a round-robin fashion.

17. The circuit of claim 16, further comprising:

a plurality of input means, one coupled to each of the plurality of system channels, for receiving (i) the data strings of the first predetermined bit length from the plurality of system channels and (ii) selectively transmitting the data strings to the buffer register means.

18. The circuit of claim 16, further comprising:

a plurality of cipher text storage means, one associated with each of the plurality of system channels, for selectively receiving an encrypted/decrypted data block of the second predetermined bit length from the encryption/decryption means.

19. The circuit of claim 18, further comprising:

a plurality of output means, one coupled to each of the plurality of system channels, for selectively receiving an encrypted/decrypted data string of the first predetermined bit length from one of the plurality of cipher text storage means, wherein the encrypted/decrypted data strings are portions of the encrypted/decrypted data blocks of the second predetermined bit length.

20. The circuit of claim 16, further comprising:

plaintext processing means for (i) selectively receiving a data string of the first predetermined bit length from one of the plurality of system channels and (ii) transmitting the received data string, unaltered, to one of the plurality of system channels.

21. The circuit of claim 16, wherein the encryption/decryption means comprises:

bytesub/invbytesub means being responsive to the controller means for transforming the received data block according to either the ByteSub or InvByteSub function, as defined by the AES block cipher algorithm;

shiftrow/invshiftrow means, coupled to receive data from the bytesub/invbytesub means, and being responsive to the controller means for transforming the received data according either the ShiftRow or InvShiftRow function, as defined by the AES block cipher algorithm; and mixcol/invmixcol means, coupled to receive data from the shiftrow/invshiftrow means and being responsive to the controller means for transforming the received data according to either the MixCol or InvMixCol function, as defined by the AES block cipher algorithm.

22. The circuit of claim 21, wherein the bytesub/invbytesub means comprises:

inverse affine means for receiving a vector data byte and performing an inverse affine transformation thereon to generate a transformed vector data byte;

first data switching means for:
(i) receiving the vector data byte, the transformed vector data byte, and an encrypt/decrypt control signal; and
(ii) transmitting the vector data byte when the control signal indicates the circuit is in an encrypt state and transmitting the transformed vector data byte when the control signal indicates the circuit is in a decrypt state;

inverse vector data byte determination means for:
(i) selectively receiving one of the vector data byte and the transformed vector data byte, in accordance with the control signal received by the first data switching means; and
(ii) determining an inverse vector data byte;

affine transformation means for receiving the inverse vector byte and applying an affine transformation thereon to generate a transformed inverse vector data byte; and second data switching means for:
(i) receiving the inverse vector data byte, the transformed inverse vector data byte, and the encrypt/decrypt control signal; and
(ii) transmitting the inverse vector data when the control signal indicates the circuit is in an encrypt state and transmitting the transformed inverse vector data byte when the control signal indicates the circuit is in a decrypt state.

23. The circuit of claim 16, wherein the round key generation means:

generates a round key one time during each round of the AES block cipher algorithm.

24. The circuit of claim 23, wherein the each round key is generated according to the following algorithm:

New_W0=Old_W0 XOR Kf(Old_W(nk—1));

New_W1=Old_W1 XOR New_W0;

.

.

.

New_W(nk−1)=Old_W(nk−1) XOR New_W(nk−2);

where, nk=key size; nb=block size; and Kf is a function defined in the Rindeal block cipher specification, wherein for nk=8 the above algorithm is modified as follows:

New_W4=Old_W4 XOR ByteSub(New_W3).

25. The circuit of claim 16, further comprising:

a plurality of final round key storage means, one in each of the plurality of system channels, for storing a key used for a final encryption round, as defined by the AES block cipher algorithm, wherein the cipher key storage means in each channel, responsive to the controller means, retrieves the stored key for use in a first decryption round, as defined by the AES block cipher algorithm, and wherein each round key used in subsequent decryption rounds is generated from the round key used in a previous decryption round.

26. The circuit of claim 16, further comprising:
CBC implementation means, responsive to the controller means, for implementing a CBC encryption mode.

27. The circuit of claim 26, wherein the CBC implementation means comprises:
initial value storage means for storing an initial round value; and
exclusive-OR means, responsive to the controller means, for receiving the stored initial value and XORing it with a value of a proceeding round.

28. The circuit of claim 16, wherein a combination of the second predetermined bit length/ predetermined number of times is selected from the group consisting of 128/10, 192/12, and 256/14.

29. A circuit for selectively determining S-box and inverse S-box data substitution values for a data string, the substitution values being associated with the ByteSub and InvByteSub functions, respectively, of the Advanced Encryption Standard (AES) block cipher algorithm, the circuit comprising:
inverse affine means for receiving a vector data byte and performing an inverse affine transformation thereon to generate a transformed vector data byte;
first data switching means for:
(i) receiving the vector data byte, the transformed vector data byte, and an encrypt/decrypt control signal; and
(ii) transmitting the vector data byte when the control signal indicates the circuit is in an encrypt state and transmitting the transformed vector data byte when the control signal indicates the circuit is in a decrypt state;
inverse vector data byte determination means for:
(i) selectively receiving one of the vector data byte and the transformed vector data byte, in accordance with the control signal received by the first data switching means; and
(ii) determining an inverse vector data byte;
affine transformation means for receiving the inverse vector byte and applying an affine transformation thereon to generate a transformed inverse vector data byte; and
second data switching means for:
(i) receiving the inverse vector data byte, the transformed inverse vector data byte, and the encrypt/decrypt control signal; and
(ii) transmitting the inverse vector data when the control signal indicates the circuit is in an encrypt state and transmitting the transformed inverse vector data byte when the control signal indicates the circuit is in a decrypt state.

30. The circuit of claim 29, wherein the vector data byte, or the transformed vector data byte, multiplied by the inverse vector data byte is an identity matrix modulo an irreducible polynomial in $GF(2^8)$.

31. The circuit of claim 29, wherein the irreducible polynomial is:

$$x^8+x^4+x^3+x+1.$$

32. The circuit of claim 29, wherein the first and second data switching means each comprise a multiplexer.

33. A method of efficiently generating round keys on-the-fly for use in decryption rounds of the AES cipher block algorithm, comprising:

generating a key used to encrypt a block of data in a final encryption round of the AES algorithm;
storing the generated key;
retrieving the stored key; and
generating a new key for use in each subsequent decryption round, without storing the new key each time one is generated and used.

34. The method of claim 33, wherein the step of generating the key used to encrypt a block of data in the final encryption round is implemented in response to a specific command.

35. The method of claim 33, wherein the new key is generated according to the following algorithm:

$$\text{New\_W(nk-1)}=\text{Old\_W(nk-1) XOR Old\_W(nk-2)};$$
$$\text{New\_W(nk-2)}=\text{Old\_W(nk-2) XOR Old\_W(nk-3)};$$
$$\text{New\_W0}=\text{Old\_W0 XOR Kf(New\_W(nk-1)},$$

where, nk=key size; nb=block size; and Kf is the function defined in the Rindeal block cipher specification,
wherein for nk=8 the above algorithm is modified as follows:

$$\text{New\_W4}=\text{Old\_W4 XOR ByteSub(Old\_W3)}.$$

36. A circuit for implementing the Advanced Encryption Standard (AES) block cipher algorithm in a system having a plurality of channels, the circuit comprising:
a plurality of cipher key storage means, one coupled to each of the plurality of system channels, for storing a cipher key received from one of the system channels,
buffer register means for selectively receiving and concatenating a plurality of data strings of a first predetermined bit length from one of the plurality of system channels into a data block of a second predetermined bit length;
round key generation means for (i) selectively receiving one of the stored cipher keys from one of the plurality of cipher key storage means and (ii) generating a round key of the second predetermined bit length from the received cipher key a predetermined number of times based on the AES Rijndael key expansion algorithm;
encryption/decryption means for (i) selectively receiving a data block of the second predetermined bit length from the buffer register means and a round key from the round key generation means and (ii) encrypting/decrypting the received data block a predetermined number of rounds based on the AES block cipher algorithm; and
controller means, responsive to control signals from each of the plurality of system channels, for controlling the round key generation means and the encryption/decryption means to selectively encrypt or decrypt a data block from individual ones of the plurality of system channels in a round-robin fashion,
wherein the encryption/decryption means comprises:
bytesub/invbytesub means for transforming the received data string according to either the ByteSub or InvByteSub function, as defined by the AES block cipher algorithm, based on the received control signal;
shiftrow/invshiftrow means, coupled to receive data from the bytesub/invbytesub mean, for transforming the received data according either the ShiftRow or InvShiftRow function, as defined by the AES block cipher algorithm, based on the received control signal; and mixcol/invmixcol means, coupled to receive data from the shiftrow/invshiftrow means, for transforming the received data according to either the MixCol or InvMixCol function, as defined by the AES block cipher algorithm, based on the received control signal.

37. The circuit of claim 36, wherein the bytesub/invbytesub means comprises:
inverse affine means for receiving a vector data byte and performing an inverse affine transformation thereon to generate a transformed vector data byte;
first data switching means for:
(i) receiving the vector data byte, the transformed vector data byte, and an encrypt/decrypt control signal; and
(ii) transmitting the vector data byte when the control signal indicates the circuit is in an encrypt state and transmitting the transformed vector data byte when the control signal indicates the circuit is in a decrypt state;
inverse vector data byte determination means for:
(i) selectively receiving one of the vector data byte and the transformed vector data byte, in accordance with the control signal received by the first data switching means; and
(ii) determining an inverse vector data byte;
affine transformation means for receiving the inverse vector byte and applying an affine transformation thereon to generate a transformed inverse vector data byte; and
second data switching means for:
(i) receiving the inverse vector data byte, the transformed inverse vector data byte, and the encrypt/decrypt control signal; and
(ii) transmitting the inverse vector data when the control signal indicates the circuit is in an encrypt state and transmitting the transformed inverse vector data byte when the control signal indicates the circuit is in a decrypt state.

38. A circuit for implementing the Advanced Encryption Standard (AES) block cipher algorithm in a system having a plurality of channels, the circuit comprising:
a round key generation circuit operable to (i) selectively receive a cipher key and (ii) generate a round key of a first predetermined bit length from the received cipher key a predetermined number of times based on the AES Rijndael key expansion algorithm;
an encryption/decryption circuit operable to (i) selectively receive a data block of the first predetermined bit length from one of the plurality of system channels and a round key from the round key generation circuit and (ii) encrypt/decrypt the received data block a predetermined number of rounds based on the AES block cipher algorithm; and
a controller, responsive to control signals from each of the plurality of system channels, operable to control the round key generation circuit and the encryption/decryption circuit to selectively encrypt or decrypt the data block from individual ones of the plurality of system channels in a round-robin fashion.

39. The circuit of claim 38, further comprising:
a plurality of cipher key storage circuits, one coupled to each of the plurality of system channels, operable to (i) store a cipher key received from one of the system channels and (ii) transmit the cipher key to the round key generation circuit.

40. The circuit of claim 38, further comprising:
a buffer register circuit operable to (i) selectively receive and concatenate a plurality of data strings of a second predetermined bit length from one of the plurality of system channels and (ii) transmit the concatenated data strings to the encryption/decryption circuit as the data block of the first predetermined bit length.

41. The circuit of claim 40, further comprising:
a plurality of input circuits, one coupled to each of the plurality of system channels, operable to receive the data strings of the second predetermined bit length from the plurality of system channels and (ii) selectively transmit the data strings to the buffer register means.

42. The circuit of claim 38, further comprising:
a plurality of cipher text storage circuits, one associated with each of the plurality of system channels, operable to selectively receive an encrypted/decrypted data block of the first predetermined bit length from the encryption/decryption circuit.

43. The circuit of claim 42, further comprising:
a plurality of output circuits, one coupled to each of the plurality of system channels, operable to selectively receive an encrypted/decrypted data string of the second predetermined bit length from one of the plurality of cipher text storage circuits,
wherein the encrypted/decrypted data strings are portions of the encrypted/decrypted data blocks of the first predetermined bit length.

44. The circuit of claim 38, further comprising:
a plaintext processing circuit operable to (i) selectively receive a data string of the second predetermined bit length from one of the plurality of system channels and (ii) transmit the received data string, unaltered, to one of the plurality of system channels.

45. The circuit of claim 38, wherein the encryption/decryption circuit comprises:
a bytesub/invbytesub circuit operable in response to the controller circuit to transform the received data string according to either the ByteSub or InvByteSub function, as defined by the AES block cipher algorithm;
a shiftrow/invshiftrow circuit, coupled to receive data from the bytesub/invbytesub means, and being operable in response to the controller circuit to transforme the received data according either the ShiftRow or InvShiftRow function, as defined by the AES block cipher algorithm; and
a mixcol/invmixcol circuit, coupled to receive data from the shiftrow/invshiftrow means, and being operable in response to the controller circuit to transform the received data according to either the MixCol or InvMixCol function, as defined by the AES block cipher algorithm.

46. The circuit of claim 45, wherein the bytesub/invbytesub circuit comprises:
an inverse affine circuit operable to receive a vector data byte and perform an inverse affine transformation thereon to generate a transformed vector data byte;
a first data switching circuit operable to:
(i) receive the vector data byte, the transformed vector data byte, and an encrypt/decrypt control signal; and
(ii) transmit the vector data byte when the control signal indicates the circuit is in an encrypt state and transmit the transformed vector data byte when the control signal indicates the circuit is in a decrypt state;

an inverse vector data byte determination circuit operable to:
- (i) selectively receive one of the vector data byte and the transformed vector data byte, in accordance with the control signal received by the first data switching circuit; and
- (ii) determine an inverse vector data byte;

an affine transformation circuit operable to receive the inverse vector byte and apply an affine transformation thereon to generate a transformed inverse vector data byte; and a second data switching circuit operable to:
- (i) receive the inverse vector data byte, the transformed inverse vector data byte, and the encrypt/decrypt control signal; and
- (ii) transmit the inverse vector data when the control signal indicates the circuit is in an encrypt state and transmit the transformed inverse vector data byte when the control signal indicates the circuit is in a decrypt state.

47. The circuit of claim 38, wherein the round key generation circuit is operable to:

generate a round key one time during each round of the AES block cipher algorithm.

48. The circuit of claim 47, wherein the each round key is generated according to the following algorithm:

New_W0=Old_W0 XOR Kf(Old_W(nk−1);

New_W1=Old_W1 XOR New_W0;

.

.

.

New_W(nk−1)=Old_W(nk−1) XOR New_W(nk−2);

where, nk=key size; nb=block size; and Kf is a function defined in the Rindeal block cipher specification, wherein for nk=8 the above algorithm is modified as follows:

New_W4=Old_W4 XOR ByteSub(New_W3).

49. The circuit of claim 39, further comprising:

a plurality of final round key storage circuits, one in each of the plurality of system channels, operable to store a key used for a final encryption round, as defined by the AES block cipher algorithm, wherein the cipher key storage circuit in each channel, responsive to the controller means, retrieves the stored key for use in a first decryption round, as defined by the AES block cipher algorithm, and wherein each round key used in subsequent decryption rounds is generated from the round key used in a previous decryption round.

50. The circuit of claim 38, further comprising:

a CBC implementation circuit, responsive to the controller, operable to implement a CBC encryption mode.

51. The circuit of claim 50, wherein the CBC implementation circuit comprises:

an initial value storage circuit operable to store an initial round value; and an exclusive-OR circuit, responsive to the controller, operable to receive the stored initial value and XOR it with a value of a proceeding round.

52. The circuit of claim 38, wherein a combination of the first predetermined bit length/ predetermined number of times is selected from the group consisting of 128/10, 192/12, and 256/14.

* * * * *